United States Patent

Ghosh et al.

[11] 3,936,728
[45] Feb. 3, 1976

[54] METHOD AND MEANS FOR INVESTIGATING THE DISTRIBUTION OF ELECTRICAL CONDUCTIVITY IN THE GROUND

[75] Inventors: Mrinal K. Ghosh, Scarborough; Philip G. Hallof, Don Mills, both of Canada

[73] Assignee: McPhar Geophysics Limited, Don Mills, Canada

[22] Filed: Nov. 29, 1973

[21] Appl. No.: 420,019

[52] U.S. Cl. .................................. 324/6; 324/3
[51] Int. Cl.² ..................... G01V 3/08; G01V 3/10
[58] Field of Search ........................ 324/3, 4, 6

[56] References Cited
UNITED STATES PATENTS

| | | | |
|---|---|---|---|
| 1,718,352 | 6/1929 | Guilford | 324/6 |
| 1,843,407 | 2/1932 | Sundberg | 324/6 |
| 2,731,596 | 1/1956 | Wait et al. | 324/6 |
| 2,903,642 | 9/1959 | Seigel | 324/6 |
| 3,015,060 | 12/1961 | McLaughlin et al. | 324/6 X |
| 3,123,767 | 3/1964 | Ghose | 324/6 |
| 3,168,694 | 2/1965 | Slattery | 324/6 |
| 3,259,836 | 7/1966 | Oshry | 324/6 |
| 3,548,299 | 12/1970 | Duroux et al. | 324/6 |
| 3,551,798 | 12/1970 | Enenshtein et al. | 324/6 |
| 3,594,633 | 7/1971 | Barringer | 324/6 |
| 3,614,600 | 10/1971 | Ronka | 324/6 X |
| 3,763,419 | 10/1973 | Barringer | 324/6 |

FOREIGN PATENTS OR APPLICATIONS 795,919 10/1968 Canada .................................. 324/6

Primary Examiner—Gerard R. Strecker

[57] ABSTRACT

The invention relates to the obtaining of highly diagnostic information concerning the distribution of electrical conductivity (resistivity) in the ground between two points by creating an electromagnetic field whose frequency can be varied over a desired range at one of the points and detecting and comparing at the other of the points, at a plurality of transmitted frequencies, components of the magnetic and/or electric field which are in phase and out of phase with a reference signal derived electromagnetically at the second point from the transmitted field whereby no cable or other physical connection between the two points are required. The invention also relates to apparatus by means of which the electromagnetic field is created, the reference signal electromagnetically derived and the in phase and out of phase magnetic and/or electric field components detected.

15 Claims, 3 Drawing Figures

METHOD AND MEANS FOR INVESTIGATING THE DISTRIBUTION OF ELECTRICAL CONDUCTIVITY IN THE GROUND

This invention relates to a method and apparatus for investigating the distribution of electrical conductivity (resistivity) in ground to detect horizontal or dipping discontinuities in such distribution for the purpose of delinearing, for example, geothermal and permafrost zones or detecting water underlying the surface or anomalous conducting zones constituted by ore bodies or the like.

BACKGROUND OF THE INVENTION

In the past the usual method of attempting to measure the resistivity or conductivity of the earth's surface has been through the use of electrodes driven in the ground, applying a potential across such electodes and then measuring the current flowing between the electrodes through the ground. Such a method requires the utilization of survey lines and the establishing of good electrical contact between the electrodes and the ground with the result that the method is not only slow and cumbersome and provides a paucity of information but cannot be used at all where conditions such as winter or rocky terrain preclude the electrodes from establishing proper electrical contact with the ground to be measured.

Use has also been made of electromagnetic fields emanating from an infinitely distance source, for instance, those propagated from high powered transmitting stations and components of such fields have been measured through the use of coupled conductive stakes driven into the ground in alignment with the direction of propagation of the wave emanating from the station and a coil oriented with its axis perpendicular to such line to determine the apparent conductivity of the earth. The limitations on such methods are readily apparent when it is considered that the control of the emitted signal including its frequency is out of the hands of the geophysical surveyor and such methods provide limited conductivity information and are effective to very limited depths.

Still again, it has been proposed to measure the tilt of a created electromagnetic field to determine the apparent conductivity of the earth's surface but such methods have limited depth penetration and relatively limited information on conductivity distribution.

Again, use has been made of a large horizontal loop laid out on the ground as a transmitting coil to create an electromagnetic field and the magnetic field component out of phase with the transmitted field has been measured at a point remote for transmitter coil as a means for detecting vertical conductor bodies. Such a method has little utility insofar as measuring the conductivity of horizontal ground layers and has a very serious physical handicap in that it requires the trailing of a cable from the transmitting point to the receiving point to provide the reference signal in phase with the transmitter coil against which the phase shift in the detected magnetic field must be compared.

SUMMARY OF THE INVENTION

According to the present invention, it has been discovered that highly diagnostic information concerning the distribution of electrical conductivity (resistivity) on the ground can be obtained between two points by creating an electromagnetic field whose frequency can be varied over a desired range (e.g. within a range of about 5 to 43,000 Hz) at one of the points and detecting and comparing at the other of the points at a plurality of transmitted frequencies components of magnetic and/or electric field which are in phase and out of phase with a reference signal derived electromagnetically at the second point from the transmitted field whereby no cable or other physical connection between the two points are required.

Preferably, in carrying out the measurement of the created electromagnetic field at the receiving point in accordance with the inventionn, the in phase and out of phase components of the magnetic field are received for a first receiver coil position in which the receiving coil is oriented for minimum, and a second receiving coil position in which the receiving coil is oriented for maximum coupling with the transmitted electromagnetic field. Further in this connection, the electric field when measured is measured along the ground in a direction orthogonal to a line joining the transmitting and receiving points.

Further in accordance with the invention there is provided, a transmitter unit for creating an electromagnetic field at any selected one of a plurality of frequencies perferably within a frequency range of from about 5 to about 43,000 cycles per second ($5_{Hz}$ to 43,000 Hz), a receiver unit including a receiver coil which can be oriented for variation in coupling with the transmitted field for measuring magnetic field components, and means for deriving from the transmitted signal a reference signal and delivering same to said receiving unit, the receiver unit being adapted to measure the amplitude of the components of the magnetic field detected by the receiver coil which are in phase with an out of phase (i.e. in quadrature phase) with the reference signal.

Further according to the preferred embodiment of the invention there is provided a cable having means for grounding the ends thereof adapted to be strung orthogonally across a line joining the transmitting and receiving point at the receiving point, said cable being adapted to measure the orthogonal electric field component produced by the transmitter at the receiving point.

Further according to the invention, the electromagnetically derived reference signal fed to the receiver unit may be derived either from the electrical field component detecting cable or form an auxiliary coil set up adjacent to the receiving point and preferably, through not necessarily, oriented for maximum coupling with the transmitter coil.

These and other objects and features will become apparent from the following detailed description taken in conjunction with the accompanying drawings.

DETAILED DESCRIPTION OF THE DRAWINGS

DETAILED DESCRIPTION OF THE INVENTION

Figure 1:
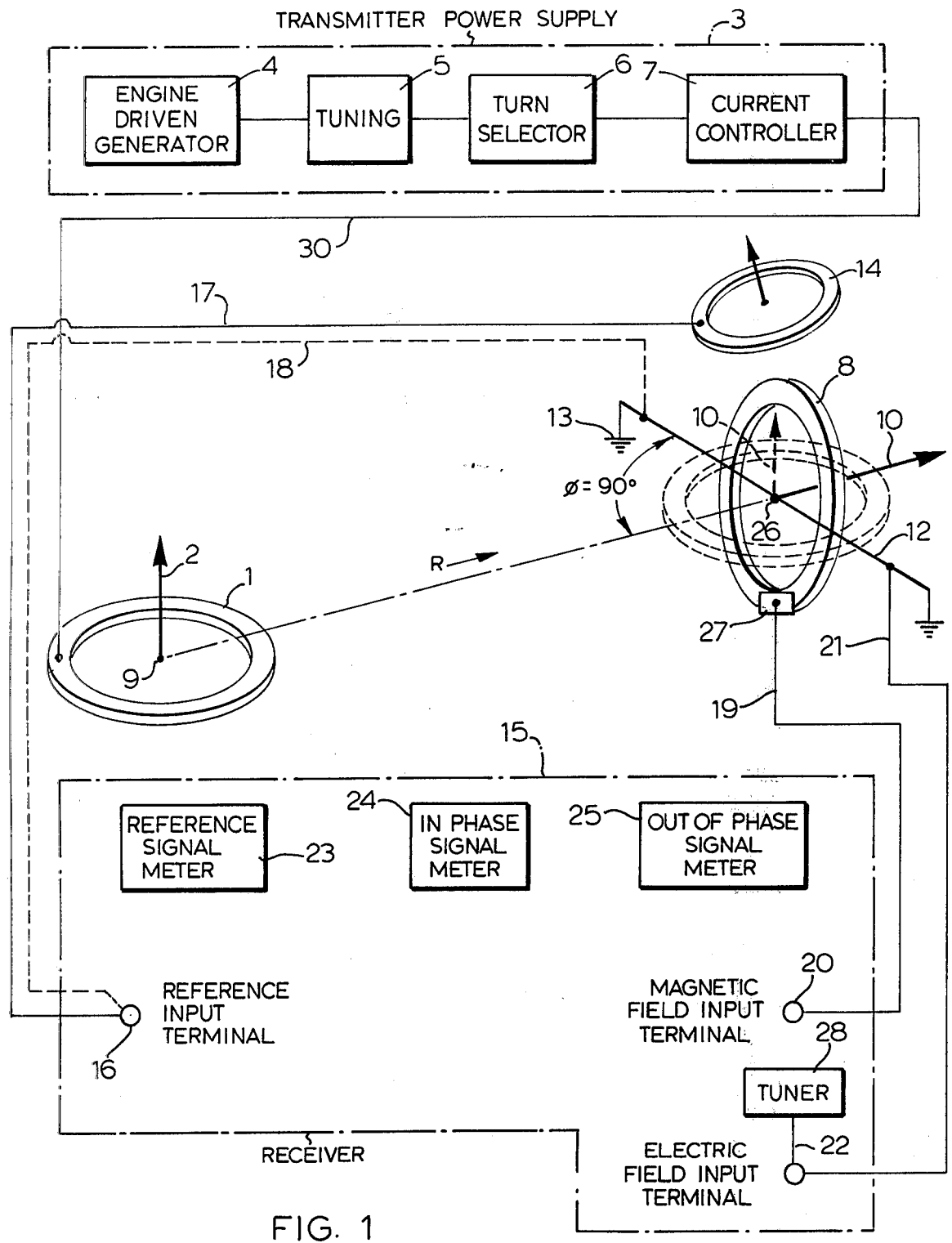
FIG. 1 is a diagrammatic view showing one set up of the transmitter coil and the receiver coil for carrying out measurements in accordance with the invention, the receiver coil being shown in solid line for minimum coupling and in dotted line for maximum coupling with the transmitted electromagnetic field and the transmitter power supply and receiver unit being shown in block form.

With reference first to FIG. 1, the transmitter coil designated at 1 is illustrated as a coil laid out generally horizontally on the ground and having its axis 2 vertical. This coil may comprise a plurality of turns laid out in a generally circular path on the ground and having a diameter which may for example be 150 feet. The transmitter is energized by means of a transmitter power supply generally designated at 3 which comprises an engine driven generator 4, a tuning unit 5 containing a plurality of condensers for tuning the output of the transmitter coil to one of a number of selectable frequencies, for example, a test unit has been built in which the transmitter coil may be energized to transmit an electromagnetic field at 14 separate frequencies ranging from about 5 Hz to about 43,000 Hz in progressive steps (not including the usual power line frequencies of 50 to 60 cycles to avoid interference from the usual power line transmission). Preferably the transmitter power supply also includes a turn selector 6 so that the number of turns of the transmitter coil 1 energized may be varied as desired (e.g. from 1 to about 10 turns). Additionally the transmitter power supply includes a current controller 7 so that the current delivered to the transmitter coil 1 through the line 30 may be varied up to a maximum of about 10 to 15 amperes.

The receiver coil 8 which may for example be conveniently be supported in a suitable yoke or other support structure (not shown) is arranged to be supported at a distance R measured radially from the centre 9 of the transmitter coil for orientation so that its axis 10 shown in solid line is aligned with the line of sight direction R to the centre of the transmitter coil and the plane of its turns perpendicular thereto for minimum coupling with the magnetic field component generated by the energization of the transmitter coil 1. The receiver coil is shown in dotted outline in a 90° relation to the solid line position in which the axis 10 is illustrated in dotted line as perpendicular to the direction R and parallel to the axis 2 of the transmitter coil for maximum coupling with the magnetic field produced by energization of the transmitter coil 1. Extending orthogonally across the line R and intersected by the axis of the receiver coil 8 when same is in the dotted line position is a cable 12 having its ends 13 grounded. This cable 12 is arranged to measure the electric field created by energization of the transmitter coil 1 over the surface of the ground orthogonally to R.

Shown adjacent to the receiver coil 8 is an auxiliary receiver coil 14 which may be oriented in any desired direction but preferably for essentially maximum coupling with the magnetic field component of the electromagnetic field created by energizing transmitter coil 1.

A receiver unit generally designated at 15 is provided and includes a reference input terminal 16 shown connected by the solid line 17 with the auxiliary receiver coil 14 to provide a reference signal against which the in phase and out of phase (quadrature) components of the magnetic field detected by the receiver coil for each position and the electric field detected by the cable 12 may be compared. Alternatively, the reference signal may be obtained simply from the cable 12 by connecting the cable to the reference input terminal 16 as illustrated by the dotted line 18 and the auxiliary coil 14 may be dispensed with.

Conductor cable 19 provides the connection from the receiver coil 8 to the magnetic field input terminal 20 and conductor 21 provides the connection between the cable 12 and the electric field input terminal 22. For convenience, the receiver includes 3 meters, namely a reference signal meter 23, to indicate the magnitude of the reference signal; and in phase signal meter 24 to indicate selectively the magnitude of the in phase component of the magnetic field being measured by the receiver coil (that is, the magnitude of the magnetic field component which is in phase with reference signal) or the magnitude of the electric field component which is in phase with the reference signal. Meter 25 provided to measure the amplitude of the magnetic field component which is being measured which is in quadrature with the reference signal or alternatively, when the electric field measured by the cable 12 is being considered it measures the magnitude of the electric field component which is in quadrature of out of phase with the reference signal.

The in phase and out of phase components of the magnetic field measured by the receiver coil 8 and the electric field measured by the cable 12 provide highly diagnostic information with respect to the ground conductivity distribution or, of course, the inverse characteristic, namely the ground resistivity or distribution. In carrying out the measurements, a series of measurements are made with the transmitter coil tuned to one frequency then a second series of corresponding measurements are made with the transmitter tuned to provide a different frequency and so on until a plurality of measurements are made at a plurality of different frequencies, the lower frequencies looking to greater depth in the ground than the higher frequencies. The measurements obtained thus provide a means for determining the conductivity (resistivity) discontinuities at various depths in the ground to delineate horizontally disposed or dipping zones of conductivity change. Thus for example the invention is useful for delineating geothermal zones or the depth of permafrost whose conductivity characteristics are different from the unfrozen ground, ground water bodies or conductor bodies such as ore bodies which may have a dipping characteristic but present some significant lateral extend over the depth of penetration of the created electromagnetic field, located between the transmitting point 9 and the receiving point 26. It will be understood that the receiver coil 8 will be tuned to the frequency of the transmitted electromagnetic field for each frequency (except the very lowest frequency) by means of a tuning condenser unit associated with the receiver coil and designated at 27. Similarly, the electric field detector or receiver constituted by the cable will be tuned to the transmitted signal by means of a tuning condenser unit 28 which may be associated with the receiver unit 15.

In practice for example the receiver coil 8 may be set up at a distance of say 2,000 to 3,000 yards from the transmitting point 9 and layered electrically conductive discontinuities delineated to a depth of about one half a mile.

In analyzing the measurements obtained by the receiver coil 8 and the cable 12, the most diagnostic information of the electrical conductivity (resistivity) distribution has been obtained by measuring the minimum coupled magnetic field ($H_{min}$) with the receiver coil 8 in the solid line position of FIG. 1 and the orthogonal electric field ($E_\phi$ 90°) at each of the plurality of frequencies at which the transmitter coil is operated. From these measurements the amplitude ratio of $E_\phi$ and $H_{min}$ and their phase difference is determined according to the following equations:

1st Method uses:

$$\frac{|E_\phi|}{|H_{min}|} = \frac{\sqrt{(E_{\phi,i}^2 + E_{\phi,o}^2)}}{\sqrt{(H_{min,i}^2 + H_{min,o}^2)}} = \text{amplitude ratio}$$

and, $$\text{Phase diff} = \tan^{-1}\frac{E_{\phi o}}{E_{\phi i}} - \tan^{-1}\frac{H_{min,o}}{H_{min,i}}$$

where $i$ represents the magnitude of the measured in phase component, in phase with the reference signal, and $o$ represents the out phase component out of phase or in quadrature with the reference signal, and $\tan^{-1}$ equals arc tan. Alternatively, highly useful diagnostic information is obtained through the measurement of the in phase and out of phase components of the magnetic field with the receiver coil 8 oriented for maximum coupling and minimum coupling, respectively. Again, the amplitude ratio of the maximum and minimum coupled magnetic fields are obtained and the phase difference between such fields is ascertained at the various frequencies at which the transmitter coil is energized, again providing highly diagnostic information. Again, the amplitude ratio and the phase difference are obtained as follows, where $i$ and $o$ are as above.

2nd Method uses:

$$\frac{|H_{max}|}{|H_{min}|} = \frac{\sqrt{H_{max,i}^2 + H_{max,o}^2}}{\sqrt{H_{min,i}^2 + H_{min,o}^2}} = \text{amplitude ratio}$$

$$\text{phase diff} = \tan^{-1}\frac{H_{max,o}}{H_{max,i}} - \tan^{-1}\frac{H_{min,o}}{H_{min,i}}$$

As a cross check, for example, it will be obvious that the amplitude ratio and phase difference of $E\phi$ and $H_{min}$ may be ascertained and also the amplitude ratio and phase difference of $H_{max}$ and $H_{min}$ may be ascertained and the results compared for cross co-relation. Alternatively, diagnostic information is obtained directly from the amplitude ratios of $E\phi$ and $H_{min}$. For example the characteristic of the ground conductivity distribution p (Cagniard) may be determined from the following formula:

$$p(\text{Cag.}) = \frac{1}{\omega\mu}\left[\frac{|E\phi|}{|H_{min}|}\right]^2$$

where
$\omega$ = circular frequency = $2\pi f$
$\mu$ = magnetic permeability in free-space = $4\pi \times 10^{-7}$ MKS unit The results obtained from the various measurements may be compared with the theoretical results obtained from a theoretical model in which the conductivity distribution in the ground is assumed to be homogeneous, or any other method of analyzing the information obtained for detecting discontinuities in the conductivity or resistivity distribution in the ground may be utilized.

Figure 2:
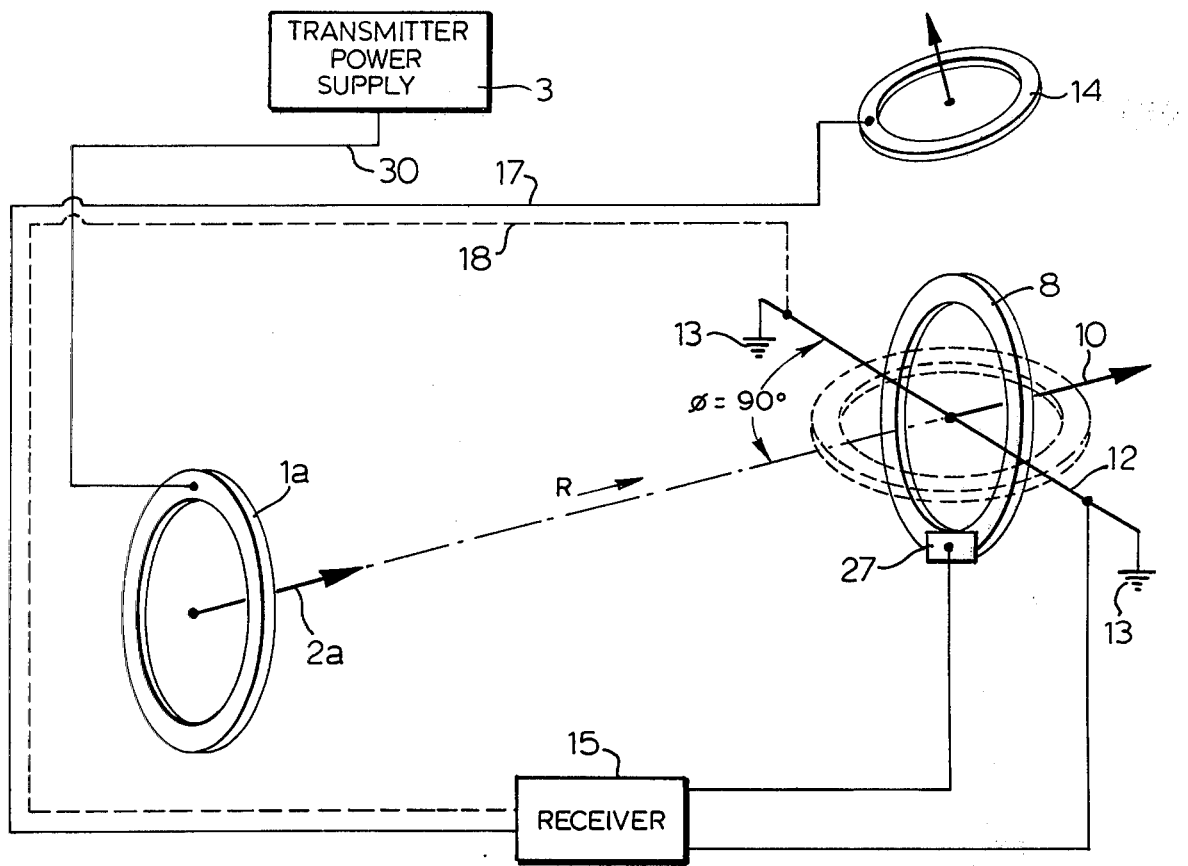
FIG. 2 is a diagrammatic view of an alternative arrangement of the transmitter coil and receiver coil for carrying out measurements in accordance with the invention and again showing the receiver coil in solid form in position for minimum coupling and in dotted form in position for maximum coupling with the transmitted electromagnetic field.

With reference to FIG. 2, the transmitter coil 1a is shown as oriented with the plane of its turns vertical and its axis 2a aligned with the direction R. In this case the diameter of the transmitter coil will be substantially smaller, e.g. of the order of 30 feet for ease of handling, but the number of turns can be increased to several times the number of turns of the large horizontal transmitter coil 1. The transmitter is energized by the same transmitter power supply 3 as described in relation to FIG. 1 and the receiver coil 8 may be the same receiver coil as used in the arrangement in FIG. 1 and the receiver unit 15 is the same as the receiver unit 15 illustrated in FIG. 1.

In the Figure arrangement, the receiver coil 8 is shown with its axis 10 in alignment with the axis 2a of the transmitter coil, i.e. in alignment with the direction or vector R in the solid line position, again for measuring $H_{min}$ (minimum coupling between the transmitter and receiver coils). In the dotted line position, the receiver coil 8 assumes the same position as in FIG. 1 and again measures $H_{max}$ (the magnetic field measured with the transmitter and receiver coils in position for maximum coupling). Again, the cable 12 is arranged orthogonal ($\phi$= 90°) to the vector R for measuring the orthogonal magnetic field. The auxiliary coil 14 again may be oriented in any desired direction but preferably for effective maximum coupling. Again it will be understood that the auxiliary coil 14 need not be employed and the reference signal can be derived from the cable 12.

Figure 3:
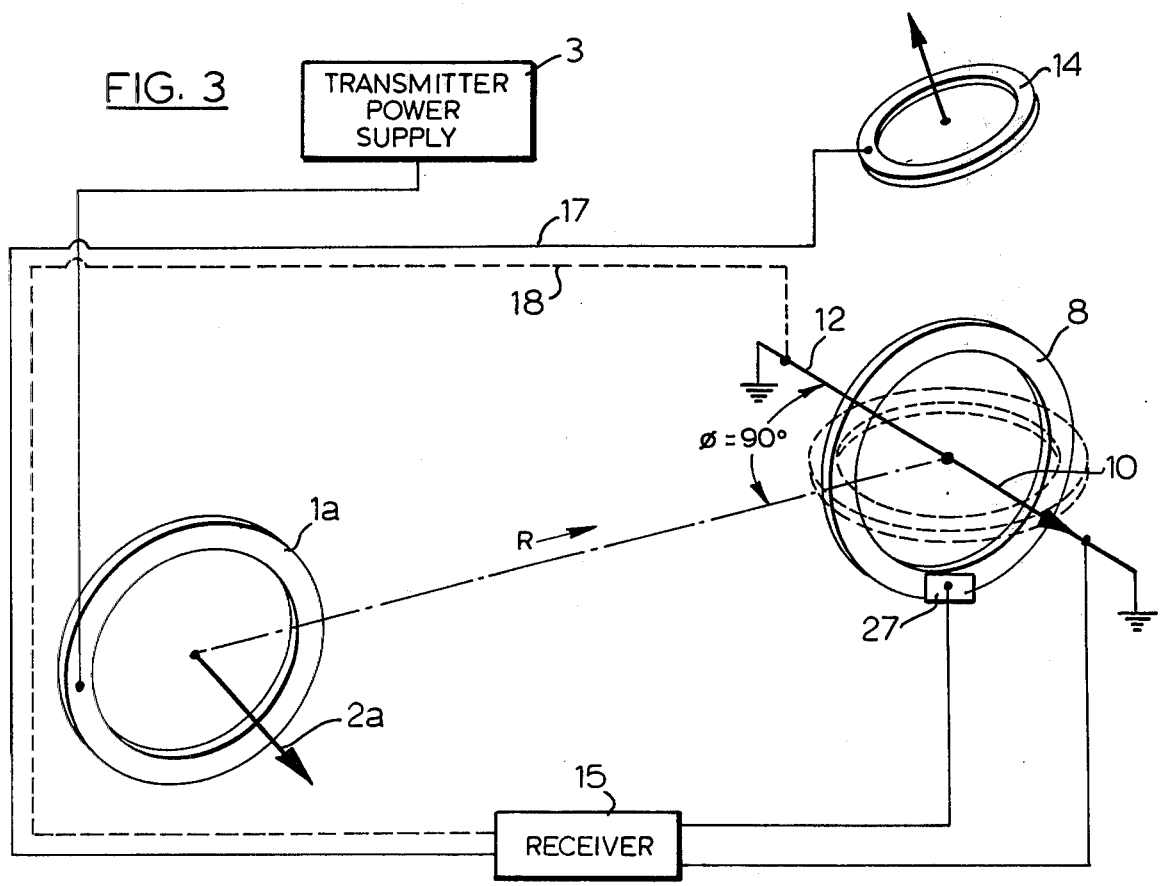
FIG. 3 is a further diagrammatic view illustrating a further arrangement of the transmitter coil and the receiver coil for carrying out measurements in accordance with the invention and showing the receiver coil in solid line in position for maximum coupling and in dotted line in position for minimum coupling with the transmitted electromagnetic field.

It will be understood that when the reference signal is electromagnetically derived by the use of the auxiliary coil 14, its orientation will remain constant for all measurements taken at a particular frequency of the transmitter coil. Since the cable 12 is always orthogonal to R, the reference signal will remain constant for all measurements when the cable is used as the means of electromagnetically deriving the reference signal. Again, for example, the same measurements are described in relation to FIG. 1 may be obtained with the set up of FIG. 2. Similarly, for FIG. 3 the same measurements obtained with respect to the set up of FIG. 1 and described in detail with reference thereto, may be obtained with the set up in FIG. 3. In FIG. 3, the transmitter coil 1a will be the same as that in FIG. 2 as will the receiver coil 8 which in turn is the same as the receiver coil in FIG. 1. However, in FIG. 3, the receiver coil is shown in solid line as being oriented with its axis 10 parallel to the axis 2a of the transmitter coil 1a, so that the solid line position of the receiver coil is the position of maximum coupling with the transmitter coil for measuring $H_{max}$, while the dotted line position of the receiver coil in FIG. 3 is the position of the coil for measuring $H_{min}$. The cable 12 again measures the electric field over the ground orthogonally to the direction R ($E\phi$= 90°). The transmitter's power supply and the receiver unit 3 and 15 respectively are identical to the transmitter's power supply and receiver unit detailed in respect of FIG. 1. Again, an auxiliary coil 14 is provided for electromagnetically deriving the reference signal at the receiving point but alternatively a reference signal may be electromagnetically derived directly from the cable 12. The use of the auxiliary coil provides a means of ensuring a reference signal of adequate magnitude if the power output of the transmitter coil is minimal or the distance between the transmitting and receiving points is large in that the auxiliary coil may be oriented for maximum coupling with the transmitter coil when initially set up. As explained once the orientation of the auxiliary coil is made, it must remain in that orientation for all measurements carried out at that particular frequency of the transmitter coil.

While the simplest form of apparatus and optimum arrangements thereof and a convenient set of measurements for obtaining diagnostic information on the ground electrical conductivity or resistivity has been particularly described, it will be understood that various modifications and alterations and different utilization of the measurements available with the system may be made without departing from the spirit of the invention or scope of the appended claims.

I claim:

1. A method of investigating the distribution of electrical conductivity in the ground for the purpose of delineating geophysical structures comprising creating an electromagnetic field at a transmitting point and measuring at a receiving point at a finite distance from said transmitter point at a series of frequencies within the frequency range of from about 5 cycles per second to about 43,000 cycles per second one or more of the magnetic induction field and the electric induction field components created by said electromagnetic field measured both in phase and out of phase with a reference signal derived electromagnetically, adjacent the receiving point, from the created electromagnetic field, and having a random phase relation thereto such measurements providing a source of information for delineating any discontinuities in the electrical conductivity in the ground.

2. A method as claim in claim 1 in which the measured component at the receiving point is the magnetic field detected by a receiver coil having minimum coupling with the created electromagnetic field measured both in phase and in quadrature with the derived reference signal 3. A method as claimed in claim 1 in which measurements are made at the receiving point of the magnetic field detected by a receiver coil having
   a. minimum coupling, and
   b. maximum coupling with the created electromagnetic field measured both in phase and in quadrature phase with the derived reference signal.

4. A method as claimed in claim 3 in which measurement is also made of the electric field at the component at the receiver point orthogonal to a line joining the transmitting and receiving points measured both in phase and in quadrature phase with the derived reference signal.

5. A method of investigating the distribution of electrical conductivity in the ground for the purpose of delineating geophysical structures comprising creating an electromagnetic field at a transmitting point and measuring at a receiving point at a plurality of difference frequencies within the range of from about 5 cycles per second to 43,000 cycles per second, the components both in phase and out of phase with a reference signal having a random phase relation to and derived from the created electromagnetic field adjacent said receiving point, of the magnetic induction field detected by a receiver coil arranged at the receiving point
   a. for minimum coupling, and
   b. for maximum coupling with the created electromagnetic field, and of the electric induction field at the receiving point orthogonal to a line joining the transmitting and receiving points, such measurements providing a source of information for delineating any discontinuities in the electrical conductivity in the ground.

6. A method as claimed in claim 5 in which the amplitude ratio and the phase difference of at least one of
   a. the magnetic field detected by minimum receiver coil coupling and the magnetic field detected by maximum receiver coil coupling, and
   b. the magnetic field detected by minimum receiver coil coupling and the orthogonal electrical field,
are compared at the plurality of frequencies at which said measurements are carried out to determine and discontinuity in the electrical conductivity in the ground.

7. A method as claimed in claim 6 in which the amplitude ratio and phase difference of both (a) and (b) are determined and compared.

8. A method as claimed in claim 6 in which said created electromagnetic field is created by energizing a transmitter coil having its turns lying generally in a horizontal plane and its axis generally vertical and said receiver coil is oriented with its axis coincidental with the line joining the transmitting and receiving points for minimum coupling and with its axis perpendicular to said line and parallel to the transmitter coil axis for maximum coupling.

9. A method as claimed in claim 6 in which said transmitter coil is oriented with its turns in a vertical plane and said receiver coil, for maximum coupling, is oriented either with its axis parallel to the transmitter coil axis or with its turns lying in the plane of a line aligned with said transmitter coil axis and joining the transmitting receiving points and its axis vertical, and said receiver coil, for minimum coupling, is oriented either with its axis coaxial with said transmitter coil axis or with its turns lying in a plane containing a line joining the transmitter and receiving points perpendicular to the transmitter coil axis and with its axis perpendicular to said line.

10. A method as claimed in claim 1 in which said reference signal is derived from an auxiliary coil located adjacent to said receiving point.

11. A method as claimed in claim 1 in which said reference signal is derived from the source of measurement of the orthogonal electric field.

12. Apparatus for use in the investigation of the distribution of electrical conductivity in the ground comprising a transmitter coil, a transmitter power source for energizing said transmitter coil at a plurality of frequencies within a frequency range of from about 5 to about 43,000 cycles per second, a receiver coil adapted to be oriented at a receiving point for maximum and minimum coupling with said transmitter coil, cable means adapted to be strung at said receiving point orthogonally across a line joining the center of said transmitting coil and said receiving point and having means for grounding the ends thereof, and means for delivering to said receiver unit a reference signal derived electromagnetically adjacent to said receiving unit, and having a random phase relation to the transmitter coil energization, said receiver unit being adapted to measure the components of the magnetic induction field detected by said receiver coil when oriented for maximum and minimum coupling which are in phase and out of phase with said reference signal, and the components of said orthogonal electric induction field which are in phase and out of phase with said reference signal.

13. Apparatus as claimed in claim 12 in which said means for delivering said reference signal to said receiver unit comprises a connection from said cable means to said receiver unit.

14. Apparatus as claimed in claim 12 in which said means for delivering said reference signal to said receiver unit comprises an auxiliary coil for location adjacent said receiving point and connection from said auxiliary coil to said receiver unit.

15. Apparatus as claimed in claim 12 having means for tuning said transmitter coil to transmit a selected plurality of frequencies and means to correspondingly tune said receiver coil and cable means to detect the transmitted magnetic and electric field components respectively at said plurality of frequencies.

* * * * *